United States Patent
Adrangi et al.

(10) Patent No.: US 11,528,607 B2
(45) Date of Patent: Dec. 13, 2022

(54) TECHNIQUES IN EVOLVED PACKET CORE FOR RESTRICTED LOCAL OPERATOR SERVICES ACCESS

(71) Applicant: Apple Inc., Cupertino, CA (US)

(72) Inventors: Farid Adrangi, Oswego, OR (US); Abhijeet Kolekar, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 20 days.

(21) Appl. No.: 17/268,152

(22) PCT Filed: Aug. 13, 2019

(86) PCT No.: PCT/US2019/046330
§ 371 (c)(1),
(2) Date: Feb. 12, 2021

(87) PCT Pub. No.: WO2020/036947
PCT Pub. Date: Feb. 20, 2020

(65) Prior Publication Data
US 2021/0168610 A1 Jun. 3, 2021

Related U.S. Application Data

(60) Provisional application No. 62/718,266, filed on Aug. 13, 2018.

(51) Int. Cl.
*H04W 12/069* (2021.01)
*H04W 8/20* (2009.01)
(Continued)

(52) U.S. Cl.
CPC ......... *H04W 12/069* (2021.01); *H04W 8/205* (2013.01); *H04W 12/08* (2013.01);
(Continued)

(58) Field of Classification Search
CPC ... H04W 12/069; H04W 12/08; H04W 12/71; H04W 12/72; H04W 8/205; H04W 48/02;
(Continued)

(56) References Cited

U.S. PATENT DOCUMENTS

| 10,772,029 B2* | 9/2020 | Kang ...................... H04W 4/50 |
| 2013/0182843 A1 | 7/2013 | Buckley et al. |
| 2019/0053139 A1* | 2/2019 | Basu Mallick ....... H04W 48/16 |

FOREIGN PATENT DOCUMENTS

KR  10-2017-0128231 A  11/2017

OTHER PUBLICATIONS

International Search Report and Written Opinion of the International Searching Authority directed to related International Patent Application No. PCT/US2019/046330 dated Dec. 3, 2019; 7 pages.
(Continued)

*Primary Examiner* — Wayne H Cai
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for performing a restricted local operator services (RLOS) authorization procedure. Various embodiments enable a network to authorize a user equipment (UE) with an RLOS access or subscription properly while aiding in minimizing or preventing potential denial-of-service (DoS) attacks. Other embodiments may be described and claimed.

20 Claims, 8 Drawing Sheets

(51) Int. Cl.
- *H04W 12/08* (2021.01)
- *H04W 48/02* (2009.01)
- *H04W 48/18* (2009.01)
- *H04W 60/00* (2009.01)
- *H04W 12/72* (2021.01)
- *H04W 12/71* (2021.01)
- *H04L 9/40* (2022.01)

(52) U.S. Cl.
CPC .......... *H04W 48/02* (2013.01); *H04W 48/18* (2013.01); *H04W 60/00* (2013.01); *H04L 63/1458* (2013.01); *H04W 12/71* (2021.01); *H04W 12/72* (2021.01)

(58) Field of Classification Search
CPC .... H04W 48/18; H04W 60/00; H04L 63/1458
See application file for complete search history.

(56) References Cited

OTHER PUBLICATIONS

Samsung, 'RLOS service for the attached UE in limited state', S2-183673, SA WG2 Meeting #127, Apr. 10, 2018; See pp. 1, 2 and figure 7.2.2-1.

Ericsson, 'Solution to Key issue #IMS-4: Support of emergency services by UEs attached for RLOS', S2-184026, 3GPP SA WG2 Meeting #127 S2, Apr. 23, 2018; See pp. 1-7 and figure 7.x.1-1.

NEC Corporation, 'Solution for RLOS attach procedure.', S2-183410, 3GPP TSGSA2 Meeting #127, Apr. 10, 2018; See pp. 1, 2.

Qualcomm Incorporated, 'Requiring the UE to set the restricted local operator service call type indicator when requesting RLOS', SI-180475, 3GPP TSG-SA WGI Meeting #81, Feb. 12, 2018; See pp. 1-3.

* cited by examiner ized as prior art against the present disclosure. Unless otherwise indicated herein, the approaches described in this section are not prior art to the claims in the present disclosure and are not admitted to be prior art by inclusion in this section.

TECHNIQUES IN EVOLVED PACKET CORE FOR RESTRICTED LOCAL OPERATOR SERVICES ACCESS

CROSS REFERENCE TO RELATED APPLICATION

The present application is a National Stage entry from PCT/US2019/046330 filed on Aug. 13, 2019, entitled "Techniques in Evolved Packet Core for Restricted Local Operator Services Access", which claims priority to U.S. Provisional Patent Application No. 62/718,266, filed Aug. 13, 2018, entitled "EPC Solution for RLOS Access," which are hereby incorporated by reference in their entireties.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In restricted local operator services (RLOS) networks, an unauthenticated user equipment (UE) may request to be wirelessly connected to a network and use certain services therein. However, various issues may arise under such wireless access related to an evolved packet core (EPC) network to obtain certain connectivity. For example, denial-of-service (DoS) attacks may occur in the network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
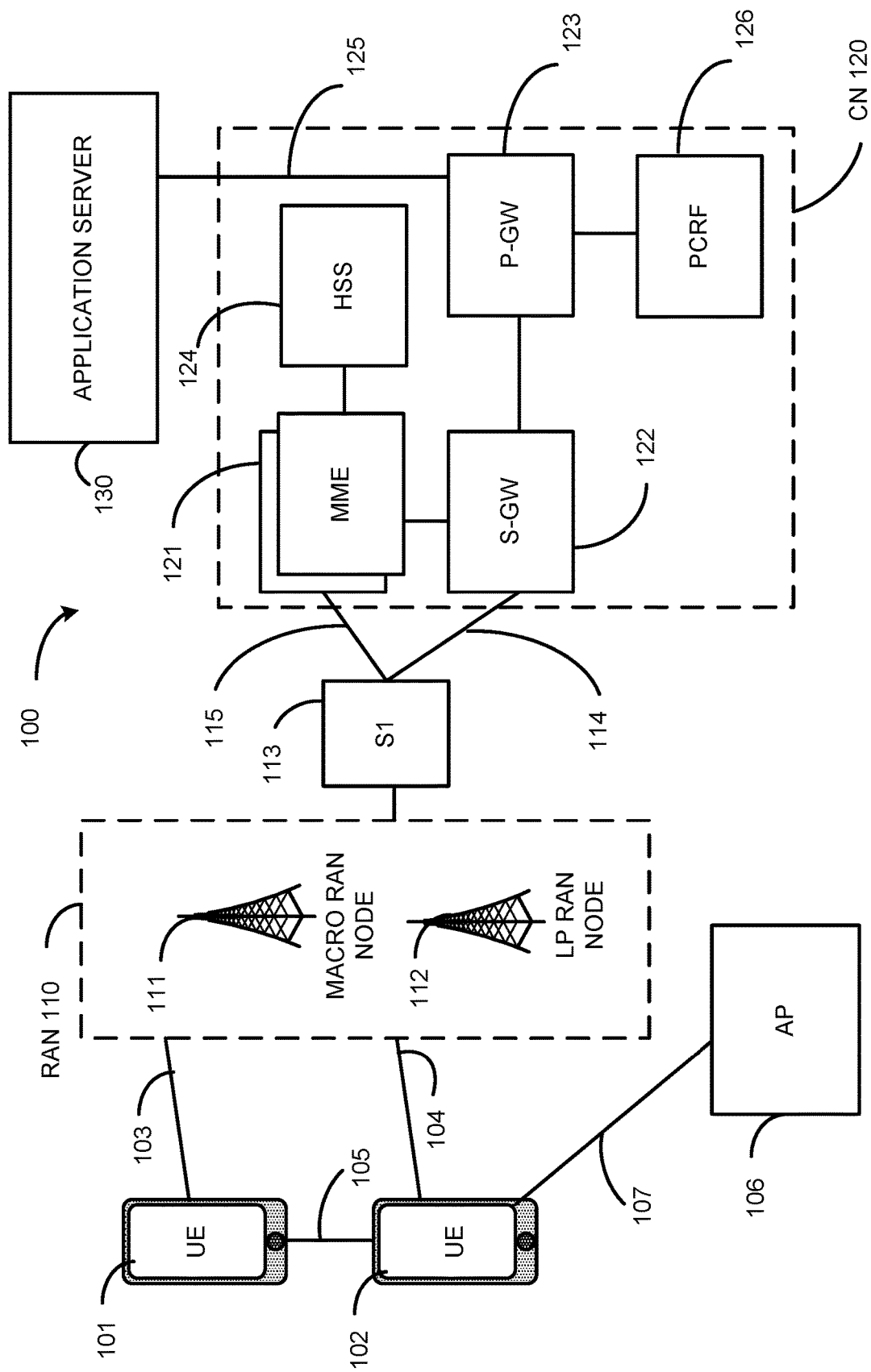
FIG. 1 schematically illustrates an example architecture of a system of a wireless network in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), that provides the described functionality. In some embodiments, the circuitry may execute one or more software or firmware modules to provide the described functions. In some embodiments, circuitry may include logic, at least partially operable in hardware.

An unauthenticated UE may be able to access to an operator's network for certain services provided by the network. Once the unauthenticated UE successfully downloads corresponding subscription profile(s) for accessing the network, the unauthenticated UE may need to disconnect from an existing network and perform an authentication procedure with the subscription profile(s). An unauthenticated UE refers to an UE that is not authenticated to access a serving network and/or certain services provided by the serving network. In such a procedure, an EPC network may allow the unauthenticated UE to access the network for certain restricted local operator services (RLOS). However, issues may arise under an existing access authentication procedure. For example, DoS attacks may occur and impact the EPC network.

Conventionally, a UE may attach to a fourth generation (4G) network and/or fifth generation (5G) network. The UE may request to access a serving network for certain RLOS. However, an existing service network authorization procedure may lack necessary provisions and result in an unauthorized network providing service to the UE. This may result in the unauthorized network standing in the middle of services that are offered. For example, the unauthorized network in the middle of services that are offered may collect unauthorized information (e.g., payment information and other user information) without proper authorization. Meanwhile, DoS attacks to the serving network may not be prevented effectively due to existing authorization procedures.

Embodiments described herein may include, for example, apparatuses, methods, and storage media for performing an authentication procedure in, or related to, an EPC network from perspectives of both UEs and the network. Various embodiments are directed to adequate authentications to subscriptions of RLOS in a network. Such an authentication procedure may grant unauthenticated UEs to access RLOS provided by the network while mitigating DoS attacks with respect to the network.

FIG. 1 illustrates an example architecture of a system 100 of a wireless network in accordance with various embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, and/or the like.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as also referred to as "WLAN node 106", "WLAN 106", "WLAN Termination 106", or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU" and an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the S-GW 122 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
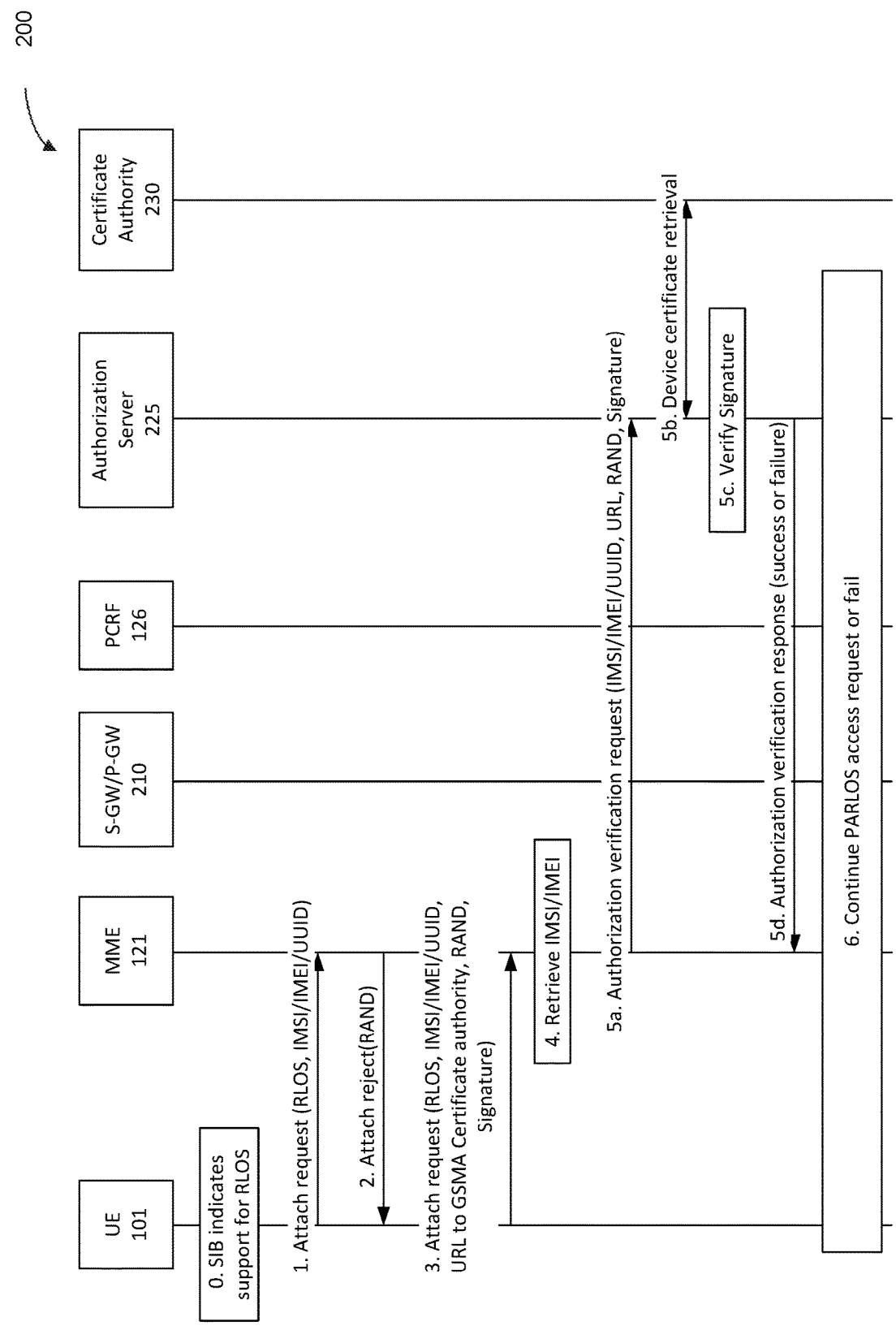
FIG. 2 illustrates an example procedure of authorizing a UE for RLOS in accordance with various embodiments.

FIG. 2 illustrates an example procedure 200 of authorizing a UE for RLOS in accordance with various embodiments. At operation 0, the UE 101 may receive and/or decode a System Information Block (SIB) message that indicates a serving network supports RLOS. The serving network may be the network to provide the RLOS, which the UE 101 seeks. The UE 101 may be unauthenticated by the RLOS and/or the serving network. While the UE 101 decodes or determines that the RLOS is available from the severing network, the UE 101 may perform further operations to obtain the RLOS.

At operation 1, the UE 101 may generate a first attach request to request subscription of the RLOS provided by the serving network. This attach request may include information of the RLOS, and certain UE identification (ID) information. Such UE ID information (also known as subscription identifier(s)) may include, but is not limited to, an international mobile subscriber identity (IMSI), an international mobile equipment identity (IMEI), and a universally unique identifier (UUID) with respect to the UE 101. The attach request may include an indication that the attach is for RLOS, which may be similar to an Emergence Attach indication that may be used for unauthenticated UEs for emergency calls and/or other like services. The attach request is transmitted to the MME 121 of the service network. Once the RLOS is granted to the UE 101, the MME 121 may determine or select a locally configured APN that is used for the RLOS. The MME 121 may corresponds to an Access and Mobility Management Function (AMF) in an NR network. In some embodiments, if the UE 101 is authenticated (e.g., in a limited state), the UE 101 may perform a detach procedure prior to operation 1.

At operation 2, the MME 121 may respond the first request from the UE 101 by transmitting an attach reject message. The attach reject message may be generated with a serving network certificate and a random number (RAND). The attach reject message may indicate or request the UE 101 to send another attach request with the same and/or additional information with respect to the authorization of the RLOS. The RAND is a random number generated by the MME and it may be, for example, 16 or 64 bits long. The RAND may be used by the UE to generate an authorization signature.

At operation 3, the UE 101 may respond to the attach reject message by generating a second attach request message. Upon reception of the attach reject message from the MME 121, the UE 101 may generate the authorization signature based on the attach reject message. The second attach request may include the RAND received by the UE 101, or an information generated based on the received RAND. This information may be generated based on the received RAND and a number of other parameters. It may avoid or reduce replay attack(s) to the serving network by using the RAND.

In embodiments, the second attach request message may include the same or substantially similar information of the requested RLOS. The second attach request message may include the same or substantially similar information of the IMSI, IMEI, and/or UUID of the UE 101. Further, the UE 101 may generate or provide a uniform resource locator (URL) of a global system for mobile communications association (GSMA) device certificate with respect to the UE 101. In embodiments, the URL of the GSMA device certificate may be signed with a private key by the UE 101. Such a signature of the UE 101 may be provided based on an indication or request in the attach reject message. Note that the UE 101 may be equipped with an enhanced Universal Integrated Circuit Card (eUICC) with public/private keys, which is provisioned at a manufacturing phase to correspond to a certificate. The URL may include a pointer to a certificate authority 230 and a unique identifier of the UE 101. For example, the URL may be in a form of, or similar to, www.RLOSA.com/DeviceID=xxxx.

At operation 4, the MME 121 may retrieve the IMSI, if it is transmitted by the UE 101. The MME 121 may retrieve the IMEI via software verification, if it is transmitted by the UE 101.

At operations 5a-5d, the serving network may perform verifications regarding the authorization information transmitted by the UE 101.

At operation 5a, the MME 121 may transmit an authorization verification request message to an authorization server 225 in the network. The authorization verification request message may include one or more subscription identifiers (IMSI, IMEI, UUID, etc.) received by the MME 121. The authorization verification request message may also include the URL and the RAND. The authorization verification request message may further include the signature signed by the UE 101.

At operations 5b-5c, the authorization server 225 may have a business relationship with a certificate authority 230 that is identified by the URL. The authorization server 225 may retrieve the device certificate by contacting the certificate authority 230 by the URL. In such a way, the received signature in the authorization verification request message from the MME may be verified by the authorization server 225. The verification may result in an outcome of success or failure. In some embodiments, the certificate authority 230 may be part of the authorization server 225.

At operation 5d, the authorization server 225 may generate an authorization verification response message and transmit it to the MME 121. The authorization verification response message may include the result of the verification corresponding to operations 5b-5c. The result may include an indication of success or failure with respect to the verification of UE 101.

At operation 6, the MME 121 may continue this RLOS access procedure for EPC in accordance with corresponding 3GPP system aspects working group (SA2) specifications. This process may be referred to as provision of access to RLOS. If the authorization verification response message indicates a successful verification, the MME 121 may authorize the UE 101 with access or subscription to the RLOS. If the authorization verification response message indicates a failed verification, the MME 121 may discontinue this RLOS access/attach procedure by sending a final attach reject message to the UE 101.

In embodiments, the above-described procedure may be applicable to LTE technologies, NE technologies, and various future wireless technologies. Note that the MME may be referred to as an access and mobility management function (AMF), or other like terms.

Figure 3:
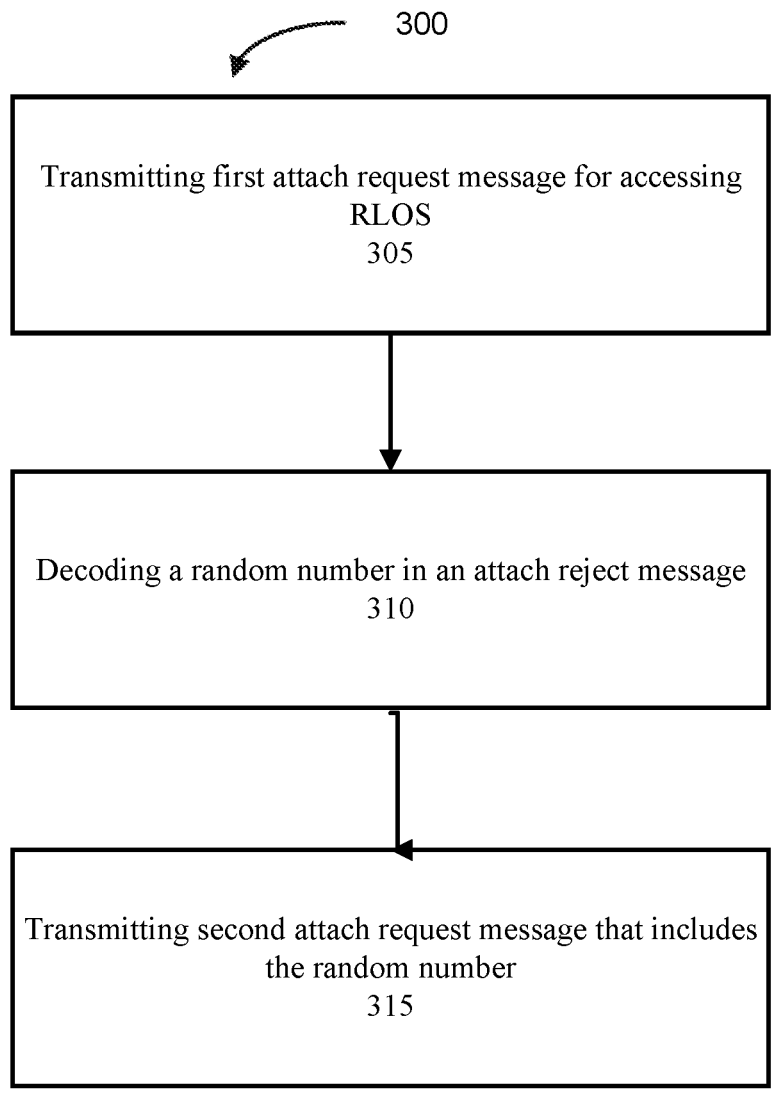
FIGS. 3, 4, and 5 illustrate an operation flow/algorithmic structure to facilitate an RLOS access authorization procedure in accordance with various embodiments.

FIG. 3 illustrates an operation flow/algorithmic structure 300 to facilitate an RLOS access authorization procedure in accordance with various embodiments. The operation flow/algorithmic structure 300 may be part of the procedure of RLOS access authorization as illustrated with respect to FIG. 2. The operation flow/algorithmic structure 300 may be performed by the UE 101 or circuitry thereof.

The operation flow/algorithmic structure 300 may include, at 305, transmitting a first attach request message for accessing RLOS provided by a serving network. In various embodiments, the first attach request message may be the same as or substantially similar to the first attach request message at operation 1 with respect to FIG. 2, which may include information of the request RLOS, subscription identifier(s), and/or other information regarding UE. One or more subscription identifiers may include, but are not limited to, IMSI, IMEI, and UUID of the UE 101. The UE 101 may generate the first attach request message to include some or all of the above-mentioned information. The UE 101 may be unauthenticated or authenticated by the serving network.

The operation flow/algorithmic structure 300 may include, at 310, decoding, upon reception of an attach reject message, a random number (RAND) in the attach reject message. The attach reject message may be the same as or substantially similar to the attach reject message at operation 2 with respect to FIG. 2, which may include the RAND and other requests with respect to the UE authorization/authentication procedure to gain access/subscription to the RLOS. The UE 101 may receive the attach reject message via corresponding network node(s) and/or entities.

The operation flow/algorithmic structure 300 may include, at 315, transmitting a second attach request message that includes the random number. The attach reject message may be the same as or substantially similar to the second attach request message at operation 3 with respect to FIG. 2, which may include the RAND and other authorization information with respect to the UE authorization/authentication procedure to gain access/subscription to the RLOS. In embodiments, the second attach request message may include the same or substantially similar information of the IMSI, IMEI, and/or UUID of the UE 101, as the subscription identifier(s) included in the first attach request message. Upon request(s) by the MME or AMF in the attach reject message, the UE 101 may generate or provide a uniform resource locator (URL) of a global system for mobile communications association (GSMA) device certificate with respect to the UE 101. In embodiments, the URL of the GSMA device certificate may be signed with a private key by the UE 101. Such a signature of the UE 101 may be provided based on an indication or request in the attach reject message. Note that the UE 101 may be equipped with an eUICC with public/private keys, which is provisioned at manufacturing phase to correspond to a certificate. The UE 101 may generate the second attach request message based on reception of the attach reject message by the MME 121 or an AMF.

Figure 4:
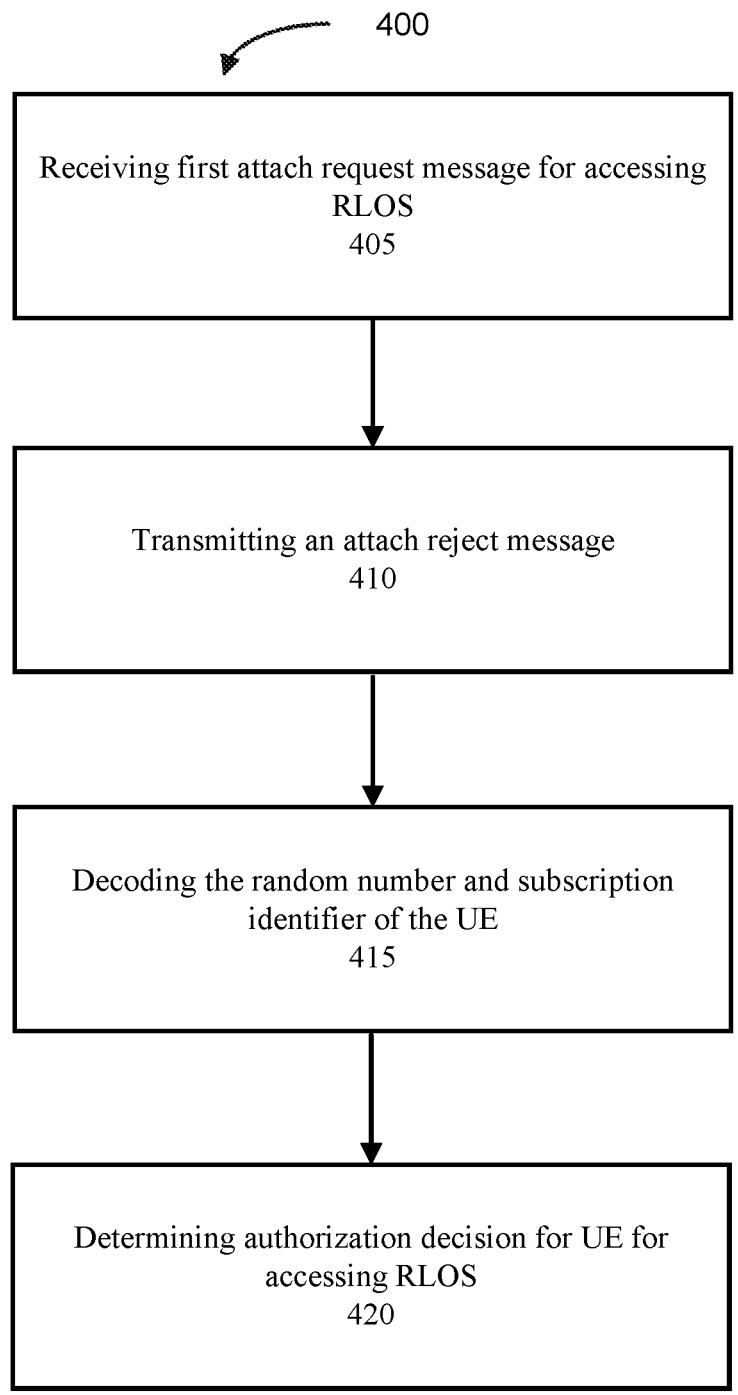

FIG. 4 illustrates an operation flow/algorithmic structure 400 to facilitate the RLOS access authorization procedure in accordance with various embodiments. The operation flow/algorithmic structure 400 may be part of the procedure of RLOS access authorization as illustrated with respect to FIG. 2. The operation flow/algorithmic structure 400 may be performed by the MME 121, an AMF or respective circuitry thereof.

The operation flow/algorithmic structure 400 may include, at 405, receiving a first attach request message from a UE for accessing RLOS provided by a serving network associated with the MME. The MME 121 may decode the first attach request message transmitted by the UE 101.

The operation flow/algorithmic structure 400 may include, at 410, transmitting, based on reception of the first attach request message, an attach reject message that includes a random number generated by the MME or AMF. The MME or AMF may generate the attach reject message to the UE 101. The attach reject message may be the same as or substantially similar to the attach reject message at operation 2 with respect to FIG. 2, which may include the RAND and other requests with respect to the UE authorization/authentication procedure to gain access/subscription to the RLOS. The attach reject message may include one or more requests for UE authorization information.

The operation flow/algorithmic structure 400 may include, at 415, decoding, based on reception of a second attach request message from the UE, the random number in the second attach request message and one or more subscription identifiers of the UE. The second attach request message may be the same as or substantially similar to the second attach request message at operation 3 with respect to FIG. 2, which may include the RAND, UE subscription identifier information, and/or the URL of the GSMA device certificate with respect to the UE authorization/authentication procedure to gain access/subscription to the RLOS. The MME or AMF may retrieve the IMSI and/or IMEI, and verify them accordingly.

The operation flow/algorithmic structure 400 may include, at 420, determining an authorization decision for the UE to access the RLOS. The determination may be the same as or substantially similar to the procedure at operations 5a-5d with respect to FIG. 2. The authorization decision may indicate a successful verification to enable further PARLOS access procedure, or a failed verification to discontinue the RLOS attach procedure.

Figure 5:
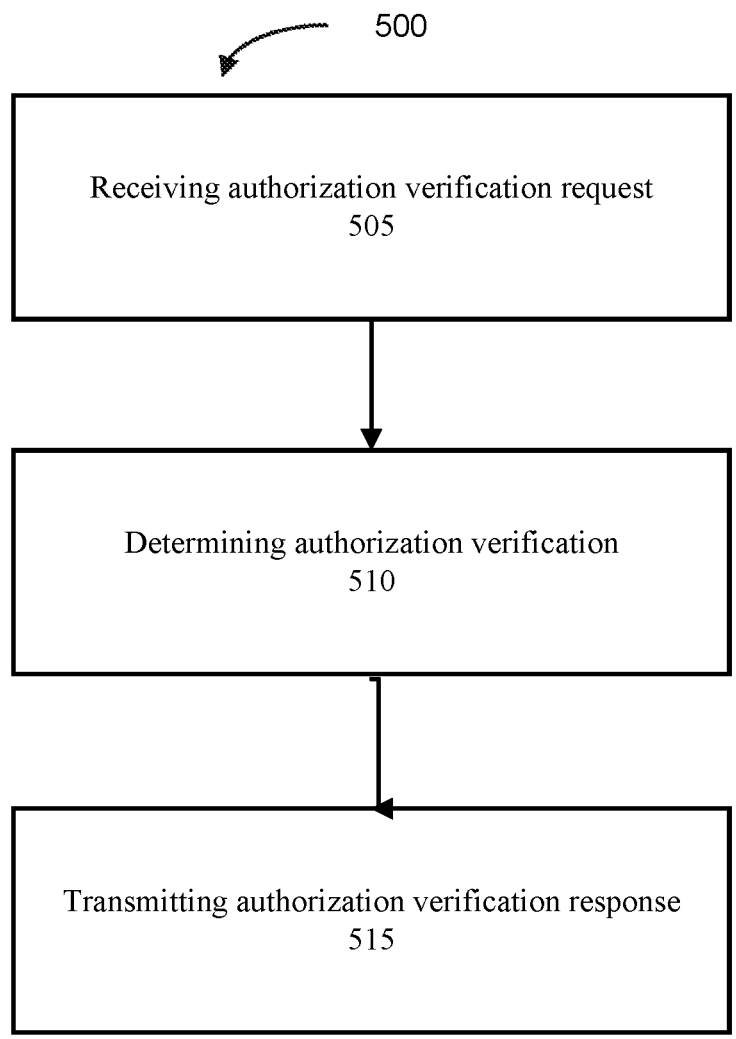

FIG. 5 illustrates an operation flow/algorithmic structure 500 to facilitate the RLOS access authorization procedure in accordance with various embodiments. The operation flow/algorithmic structure 500 may be part of the procedure of RLOS access authorization as illustrated with respect to FIG. 2. The operation flow/algorithmic structure 500 may be performed by the authorization server 225 or circuitry thereof.

The operation flow/algorithmic structure 500 may include, at 505, receiving an authorization verification request message from the MME or AMF. The authorization verification request message may be the same as or substantially similar to the authorization verification request message at operation 5a with respect to FIG. 2, which may include the RAND, UE subscription identifier information, URL, and/or signature by the UE.

The operation flow/algorithmic structure 500 may include, at 510, determining an authorization verification based on the authorization verification request message. The determination of the authorization verification of the UE may be the same as or substantially similar to the authorization verification request message at operations 5b-5c with respect to FIG. 2. The authorization server 225 may retrieve a device certificate. In some embodiments, the retrieval may be from a certificate authority 230. The authorization server 225 may verify the received signature and/or other UE information with the retrieved device certificate information. The authorization server 225 may render a decision regarding whether the UE is verified successfully or not.

The operation flow/algorithmic structure 500 may include, at 515, transmitting an authorization verification response to the MME. The authorization verification response may be the same as or substantially similar to the authorization verification request message at operations 5d with respect to FIG. 2.

The following figures describe systems, devices, and components that may implement various embodiments described herein. Like named elements may be substituted for one another.

Figure 6:
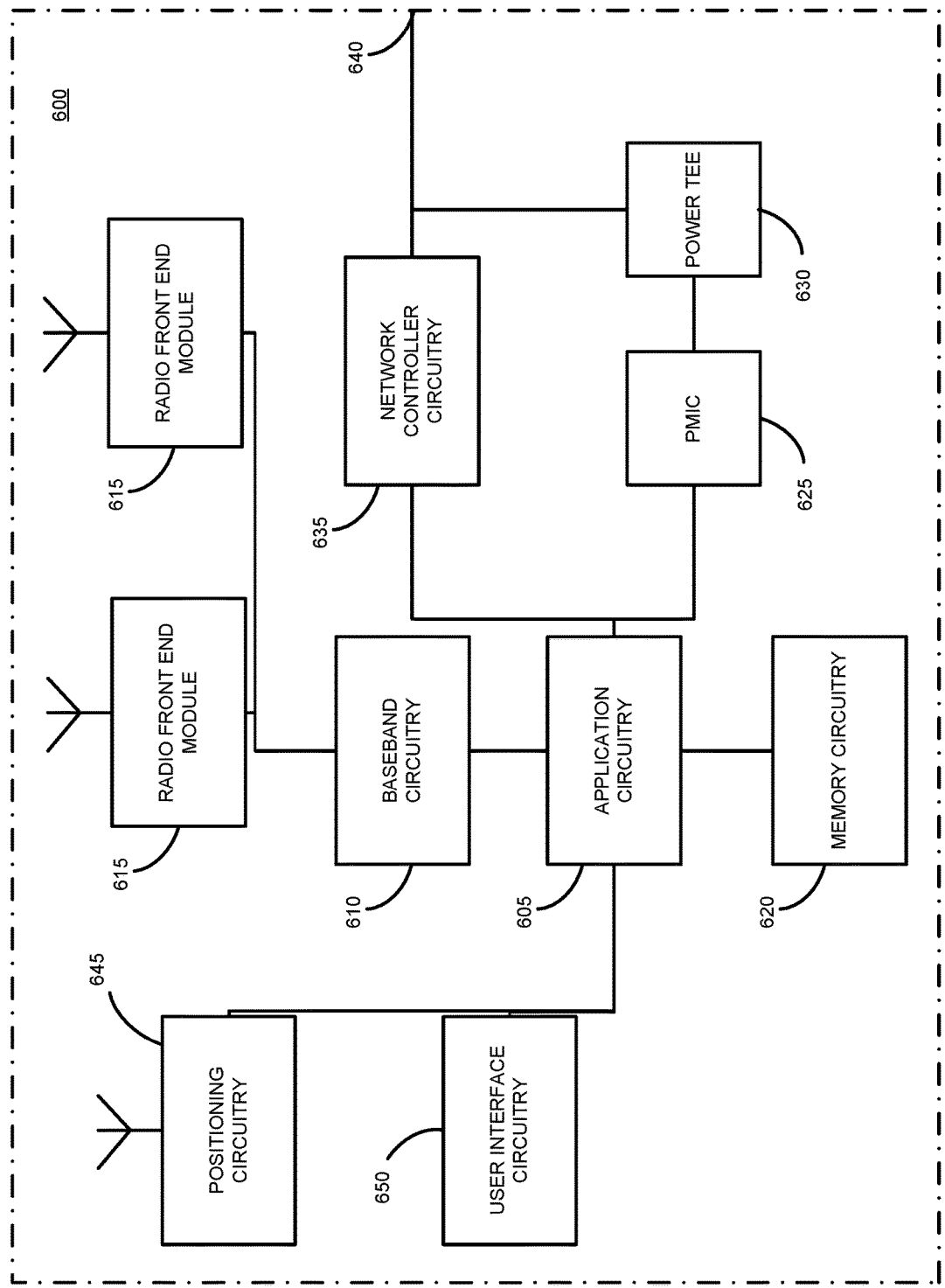
FIG. 6 illustrates an example equipment to be operated in a wireless network, in accordance with various embodiments.

FIG. 6 illustrates an example equipment 600 to be operated in a wireless network, in accordance with various embodiments. The equipment 600 (or "system 600") may be implemented as a base station, radio head, RAN node, etc. In other examples, the system 600 may be implemented in or by a UE, application server(s) 130, and/or any other element/device discussed herein. The system 600 may include one or more of application circuitry 605, baseband circuitry 610, one or more radio front end modules 615, memory circuitry 620, power management integrated circuitry (PMIC) 625, power tee circuitry 630, network controller circuitry 635, network interface connector 640, satellite positioning circuitry 645, and user interface circuitry 650. In some embodiments, the system 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 120 may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 605 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or TO), memory card controllers such as Secure Digital (SD/)MultiMediaCard (MMC) or similar, Universal Serial Bus (USB) interfaces, Mobile Industry Processor Interface (MIPI) interfaces, and Joint Test Access Group (JTAG) test access ports. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 600 may not utilize application circuitry 605, and instead may include a special-purpose processor/controller to process IP data received from an EPC or 5GC, for example.

Additionally or alternatively, application circuitry 605 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric including other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (for example, the radio front end modules 615).

User interface circuitry 650 may include one or more user interfaces designed to enable user interaction with the system 600 or peripheral component interfaces designed to enable peripheral component interaction with the system 600. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 615 may comprise a millimeter wave RFEM and one or more sub-millimeter wave radio frequency integrated circuits (RFICs).

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocol. In some implementations, the network controller circuitry 635 may include multiple controllers to provide connectivity to other networks using the same or different protocols.

The positioning circuitry 645 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (e.g., including hardware devices such as switches, filters, amplifiers, antenna elements, and the like to facilitate the over-the-air (OTA) communications to communicate with components of a positioning network, such as navigation satellite constellation nodes.

The components shown by FIG. 6 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 7:
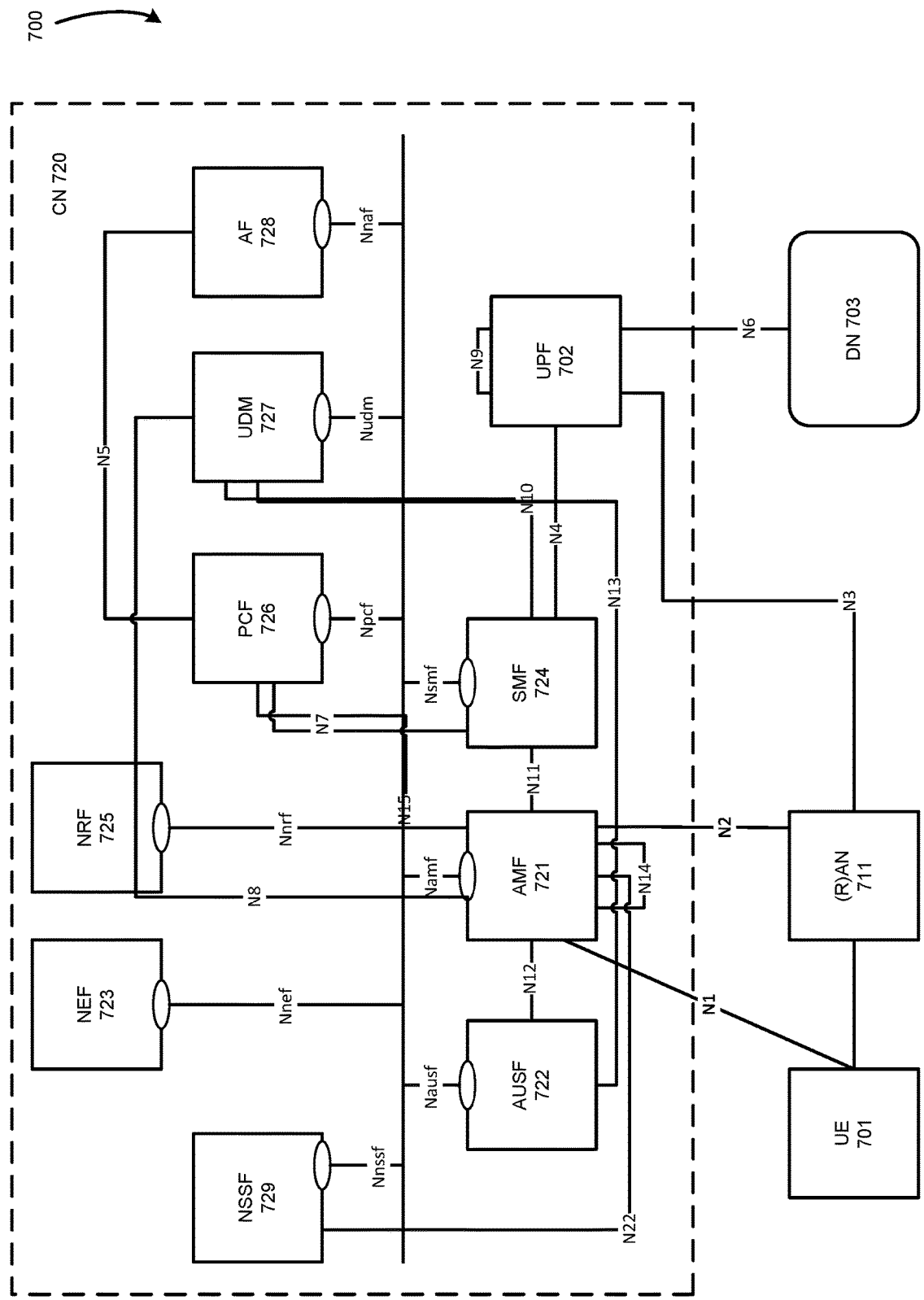
FIG. 7 illustrates an architecture of a network system in accordance with various embodiments.

FIG. 7 illustrates an architecture of a network system 700 in accordance with various embodiments. The system 700 is shown to include a UE 701, which may be the same or similar to UEs 601 and 602 discussed previously; a RAN node 711, which may be the same or similar to RAN nodes 611 and 612 discussed previously; a data network (DN) 703, which may be, for example, operator services, Internet access or 3rd party services; and a 5G Core Network (5GC or CN) 720.

The CN 720 may include an Authentication Server Function (AUSF) 722; an Access and Mobility Management Function (AMF) 721; a Session Management Function (SMF) 724; a Network Exposure Function (NEF) 723; a Policy Control Function (PCF) 726; a Network Function (NF) Repository Function (NRF) 725; a Unified Data Management (UDM) 727; an Application Function (AF) 728; a User Plane Function (UPF) 702; and a Network Slice Selection Function (NSSF) 729.

The UPF 702 may act as an anchor point for intra-RAT and inter-RAT mobility, an external PDU session point of interconnect to DN 703, and a branching point to support multi-homed PDU session. The UPF 702 may also perform packet routing and forwarding, perform packet inspection, enforce user plane part of policy rules, lawfully intercept packets (UP collection); perform traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 702 may include an uplink classifier to support routing traffic flows to a data network. The DN 703 may represent various network operator services, Internet access, or third party services. DN 703 may include, or be similar to, application server 630 discussed previously. The UPF 702 may interact with the SMF 724 via an N4 reference point between the SMF 724 and the UPF 702.

The AUSF 722 may store data for authentication of UE 701 and handle authentication related functionality. The AUSF 722 may facilitate a common authentication framework for various access types. The AUSF 722 may communicate with the AMF 721 via an N12 reference point between the AMF 721 and the AUSF 722; and may communicate with the UDM 727 via an N13 reference point between the UDM 727 and the AUSF 722. Additionally, the AUSF 722 may exhibit an Nausf service-based interface.

The AMF 721 may be responsible for registration management (e.g., for registering UE 701, etc.), connection management, reachability management, mobility management, and lawful interception of AMF-related events, and access authentication and authorization. The AMF 721 may be a termination point for an N11 reference point between the AMF 721 and the SMF 724. The AMF 721 may provide transport for Session Management (SM) messages between the UE 701 and the SMF 724, and act as a transparent proxy for routing SM messages. AMF 721 may also provide transport for short message service (SMS) messages between UE 701 and an SMS function (SMSF) (not shown by FIG. 7). AMF 721 may act as Security Anchor Function (SEA), which may include interaction with the AUSF 722 and the UE 701, receipt of an intermediate key that was established as a result of the UE 701 authentication process. Where USIM based authentication is used, the AMF 721 may retrieve the security material from the AUSF 722. AMF 721 may also include a Security Context Management (SCM) function, which receives a key from the SEA that it uses to derive access-network specific keys. Furthermore, AMF 721 may be a termination point of RAN CP interface, which may include or be an N2 reference point between the (R)AN 711 and the AMF 721; and the AMF 721 may be a termination point of NAS (N1) signalling, and perform NAS ciphering and integrity protection.

AMF 721 may also support NAS signalling with a UE 701 over an N3 interworking-function (IWF) interface. The N3IWF may be used to provide access to untrusted entities. N3IWF may be a termination point for the N2 interface between the (R)AN 711 and the AMF 721 for the control plane, and may be a termination point for the N3 reference point between the (R)AN 711 and the UPF 702 for the user plane. As such, the AMF 721 may handle N2 signalling from the SMF 724 and the AMF 721 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 701 and AMF 721 via an N1 reference point between the UE 701 and the AMF 721, and relay uplink and downlink user-plane packets between the UE 701 and UPF 702. The N3IWF also provides mechanisms for IPsec tunnel establishment with the UE 701. The AMF 721 may exhibit an Namf service-based interface, and may be a termination point for an N14 reference point between two AMFs 721 and an N17 reference point between the AMF 721 and a 5G-Equipment Identity Register (5G-EIR) (not shown by FIG. 7).

The SMF 724 may be responsible for session management (e.g., session establishment, modify and release, including tunnel maintain between UPF and AN node); UE IP address allocation and management (including optional authorization); selection and control of UP function; configuring traffic steering at UPF to route traffic to proper destination; termination of interfaces towards policy control functions; controlling part of policy enforcement and QoS; lawful intercept (for SM events and interface to LI system); termination of SM parts of NAS messages; downlink Data Notification; initiation of AN specific SM information, sent via AMF 721 over N2 to (R)AN 711; and determining SSC mode of a session. The SMF 724 may include the following roaming functionality: handle local enforcement to apply QoS SLAB (VPLMN); charging data collection and charging interface (VPLMN); lawful intercept (in VPLMN for SM events and interface to LI system); support for interaction with external DN for transport of signalling for PDU session authorization/authentication by external DN. An N16 reference point between two SMFs 724 may be included in the system 700, which may be between another SMF 724 in a visited network and the SMF 724 in the home network in roaming scenarios. Additionally, the SMF 724 may exhibit the Nsmf service-based interface.

The NEF 723 may provide means for securely exposing the services and capabilities provided by 3GPP network functions for third party, internal exposure/re-exposure, Application Functions (e.g., AF 728), edge computing or fog computing systems, etc. In such embodiments, the NEF 723 may authenticate, authorize, and/or throttle the AFs. NEF 723 may also translate information exchanged with the AF 728 and information exchanged with internal network functions. For example, the NEF 723 may translate between an AF-Service-Identifier and an internal 5GC information. NEF 723 may also receive information from other network functions (NFs) based on exposed capabilities of other network functions. This information may be stored at the NEF 723 as structured data, or at a data storage NF using standardized interfaces. The stored information can then be re-exposed by the NEF 723 to other NFs and AFs, and/or used for other purposes such as analytics. Additionally, the NEF 723 may exhibit an Nnef service-based interface.

The NRF 725 may support service discovery functions, receive NF Discovery Requests from NF instances, and provide the information of the discovered NF instances to the NF instances. NRF 725 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 725 may exhibit the Nnrf service-based interface.

The PCF 726 may provide policy rules to control plane function(s) to enforce them, and may also support unified policy framework to govern network behavior. The PCF 726 may also implement a front end (FE) to access subscription information relevant for policy decisions in a UDR of the UDM 727. The PCF 726 may communicate with the AMF 721 via an N15 reference point between the PCF 726 and the AMF 721, which may include a PCF 726 in a visited network and the AMF 721 in case of roaming scenarios. The PCF 726 may communicate with the AF 728 via an N5 reference point between the PCF 726 and the AF 728; and with the SMF 724 via an N7 reference point between the PCF 726 and the SMF 724. The system 700 and/or CN 720 may also include an N24 reference point between the PCF 726 (in the home network) and a PCF 726 in a visited network. Additionally, the PCF 726 may exhibit an Npcf service-based interface.

The UDM 727 may handle subscription-related information to support the network entities' handling of communication sessions, and may store subscription data of UE 701. For example, subscription data may be communicated between the UDM 727 and the AMF 721 via an N8 reference point between the UDM 727 and the AMF 721. The UDM 727 may include two parts, an application FE and a User Data Repository (UDR) (the FE and UDR are not shown by FIG. 7). The UDR may store subscription data and policy data for the UDM 727 and the PCF 726, and/or structured data for exposure and application data (including Packet Flow Descriptions (PFDs) for application detection, application request information for multiple UEs 701) for the NEF 723. The Nudr service-based interface may be exhibited by the UDR to allow the UDM 727, PCF 726, and NEF 723 to access a particular set of the stored data, as well as to read, update (e.g., add, modify), delete, and subscribe to notification of relevant data changes in the UDR. The UDM may include a UDM FE, which is in charge of processing of credentials, location management, subscription management, and so on. Several different front ends may serve the same user in different transactions. The UDM-FE accesses subscription information stored in the UDR and performs authentication credential processing; user identifier handling; access authorization; registration/mobility management; and subscription management. The UDR may interact with the SMF 724 via an N10 reference point between the UDM 727 and the SMF 724. UDM 727 may also support SMS management, wherein an SMS-FE implements the similar application logic as discussed previously. Additionally, the UDM 727 may exhibit the Nudm service-based interface.

The AF 728 may provide application influence on traffic routing, provide access to the Network Capability Exposure (NCE), and interact with the policy framework for policy control. The NCE may be a mechanism that allows the 5GC and AF 728 to provide information to each other via NEF 723, which may be used for edge computing implementations. In such implementations, the network operator and third party services may be hosted close to the UE 701 access point of attachment to achieve an efficient service delivery through the reduced end-to-end latency and load on the transport network. For edge computing implementations, the 5GC may select a UPF 702 close to the UE 701 and execute traffic steering from the UPF 702 to DN 703 via the N6 interface. This may be based on the UE subscription data, UE location, and information provided by the AF 728. In this way, the AF 728 may influence UPF (re)selection and traffic routing. Based on operator deployment, when AF 728 is considered to be a trusted entity, the network operator may permit AF 728 to interact directly with relevant NFs. Additionally, the AF 728 may exhibit an Naf service-based interface.

The NSSF 729 may select a set of network slice instances serving the UE 701. The NSSF 729 may also determine allowed Network Slice Selection Assistance Information (NSSAI) and the mapping to the Subscribed Single-NSSAIs (S-NSSAIs), if needed. The NSSF 729 may also determine the AMF set to be used to serve the UE 701, or a list of candidate AMF(s) 721 based on a suitable configuration and possibly by querying the NRF 725. The selection of a set of network slice instances for the UE 701 may be triggered by the AMF 721 with which the UE 701 is registered by interacting with the NSSF 729, which may lead to a change of AMF 721. The NSSF 729 may interact with the AMF 721 via an N22 reference point between AMF 721 and NSSF 729; and may communicate with another NSSF 729 in a visited network via an N31 reference point (not shown by FIG. 7). Additionally, the NSSF 729 may exhibit an Nnssf service-based interface.

As discussed previously, the CN 720 may include an SMSF, which may be responsible for SMS subscription checking and verification, and relaying SM messages to/from the UE 701 to/from other entities, such as an SMS-GMSC/IWMSC/SMS-router. The SMS may also interact with AMF 721 and UDM 727 for notification procedure that the UE 701 is available for SMS transfer (e.g., set a UE not reachable flag, and notifying UDM 727 when UE 701 is available for SMS).

The CN 720 may also include other elements that are not shown by FIG. 7, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 7). Individual NFs may share a UDSF for storing their respective unstructured data or individual NFs may each have their own UDSF located at or near the individual NFs. Additionally, the UDSF may exhibit an Nudsf service-based interface (not shown by FIG. 7). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 7 for clarity. In one example, the CN 720 may include an Nx interface, which is an inter-CN interface between the MME (e.g., MME 621) and the AMF 721 in order to enable interworking between CN 720 and CN 620. Other example interfaces/reference points may include an N5g-eir service-based interface exhibited by a 5G-EIR, an N27 reference point between NRF in the visited network and the NRF in the home network, and an N31 reference point between the NSSF in the visited network and the NSSF in the home network.

In yet another example, system 700 may include multiple RAN nodes 711 wherein an Xn interface is defined between two or more RAN nodes 711 (e.g., gNBs and the like) that connect to 5GC, between a RAN node 711 (e.g., gNB) connecting to 5GC 720 and an eNB (e.g., a RAN node 611 of FIG. 6), and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same as or similar to the user plane and/or control plane protocol stack(s) shown and described herein.

Figure 8:
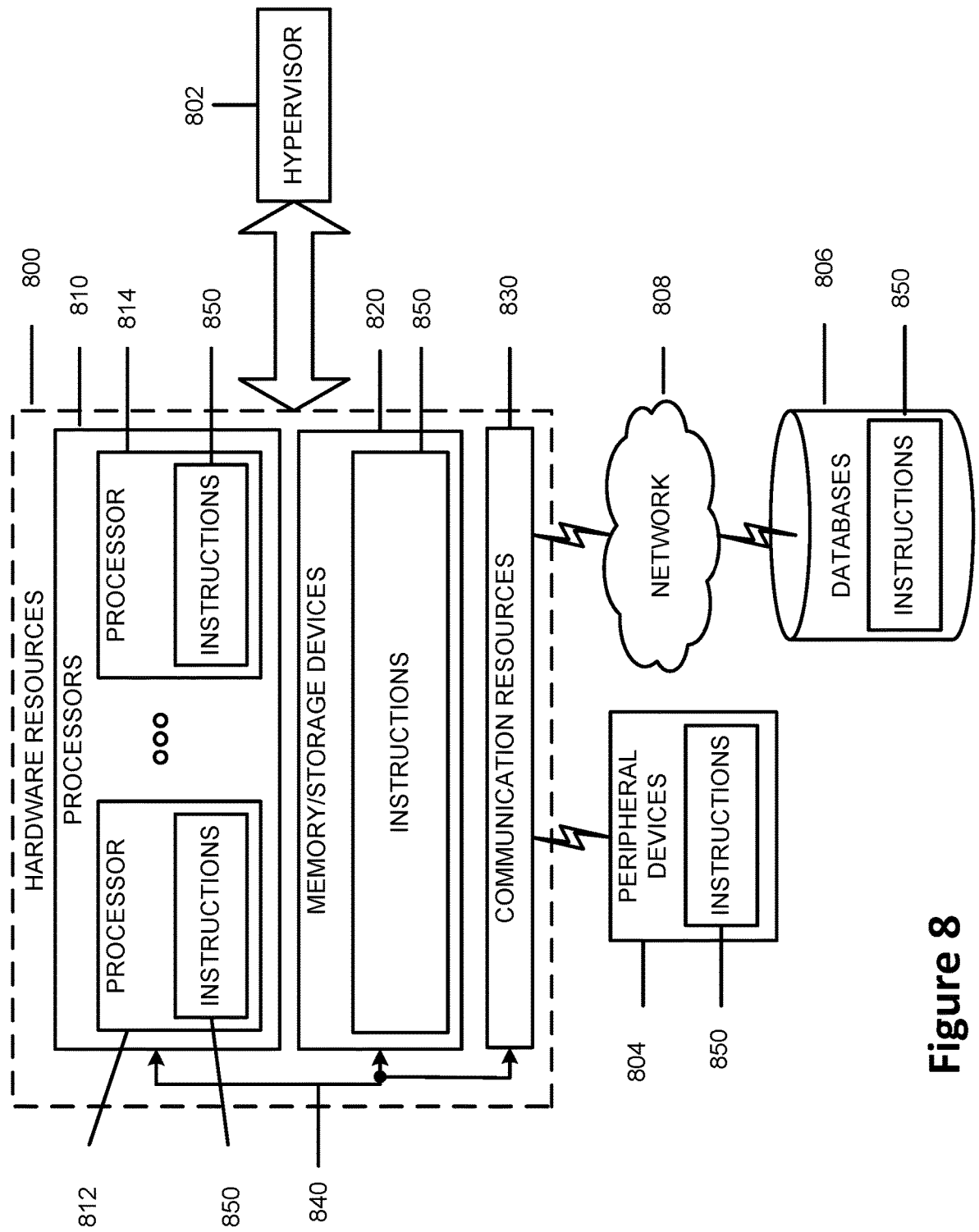
FIG. 8 is a block diagram illustrating components, according to various example embodiments, able to read instructions from a machine-readable or computer-readable medium (e.g., a non-transitory machine-readable storage medium) and perform any one or more of the methodologies discussed herein.

FIG. 8 is a block diagram illustrating components, according to various example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 802 may be executed to provide an execution environment for one or more network slices/sub-slices to utilize the hardware resources 800. A "virtualized resource" may refer to compute, storage, and/or network resources provided by virtualization infrastructure to an application, device, system, etc.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects, or services, accessible through a server where such system resources reside on a single host or multiple hosts and are clearly identifiable.

Instructions 850 may comprise software, a program, an application, an applet, an app, or other executable code for causing at least any of the processors 810 to perform any one or more of the operation flow/algorithmic structures 300, 400, and/or 500. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices or the databases. Accordingly, the memory of processors 810, the memory/storage devices 820, the peripheral devices 804, and the databases 806 are examples of computer-readable and machine-readable media.

In some embodiments, the electronic device(s), network(s), system(s), chip(s) or component(s), or portions or implementations thereof, of figures herein may be configured to perform one or more processes, techniques, or methods as described herein, or portions thereof.

Some non-limiting Examples of various embodiments are provided below.

Example 1 may include a method comprising: transmitting or causing to transmit a first attach request message for accessing restricted local operator services (RLOS) provided by a serving network to a mobility management entity (MME) or an access and mobility management function (AMF); decoding or causing to decode, upon reception of an attach reject message from the MME/AMF, a random number in the attach reject message; and transmitting or causing to transmit, to the MME/AMF, a second attach request message that includes the random number for accessing the RLOS and one or more subscription identifiers of the UE.

Example 2 may include the method of example 1 and/or some other example herein, wherein the MME/AMF is an MME/AMF of the serving network.

Example 3 may include the method of example 1 and/or some other example herein, wherein the UE is unauthenticated with respect to the serving network.

Example 4 may include the method of example 1 and/or some other example herein, wherein the first attach request message and the second attach request message respectively include information of the RLOS.

Example 5 may include the method of example 4 and/or some other example herein, wherein the first attach request message includes the one or more subscription identifiers of the UE, and wherein the one or more subscription identifiers include, at least one of, an international mobile subscriber identity (IMSI), an international mobile equipment identity (IMEI), and a universally unique identifier (UUID) with respect to the UE.

Example 6 may include the method of example 5 and/or some other example herein, wherein the second attach request message further includes a uniform resource locator (URL) of a device certificate with respect to the UE, and wherein the URL of the GSMA device certificate is signed with a private key by the UE.

Example 6.5 may include the method of example 6 and/or some other example herein, wherein the device certificate is a global system for mobile communications association (GSMA) device certificate.

Example 7 may include the method of example 1 and/or some other example herein, further comprising: disconnecting or causing to disconnect from an original network, and wherein the UE is wirelessly connected to the original network that is different from the serving network.

Example 8 may include the method of example 1 and/or some other example herein, further comprising receiving or causing to receive an authorization to access the RLOS based on a successful authorization verification by the MME/AMF.

Example 9 may include the method of example 8 and/or some other example herein, further comprising: generating or causing to generate the first attach request message; and generating causing to generate the second attach request message based on decoding the attach reject message.

Example 10 may include the method of examples 1-9 and/or some other example herein, wherein the method is performed by a UE or portions thereof.

Example 11 may include a method, comprising: receiving or causing to receive a first attach request message from an user equipment (UE) for accessing restricted local operator services (RLOS) provided by a serving network associated with the MME/AMF; transmitting or causing to transmit, based on reception of the first attach request message, an attach reject message that includes a random number generated by the MME/AMF; decoding or causing to decide, based on reception of a second attach request message from the UE, the random number in the second attach request message; and determining or causing to determine an authorization for the UE to access the RLOS, based on an authorization verification by an authorization server or entity.

Example 12 may include the method of example 11 and/or some other example herein, further comprising generating or causing to generate the attach reject message that includes the random number.

Example 13 may include the method of example 11 and/or some other example herein, wherein the attach reject message further includes a request for subscription identifier information from the UE, and wherein the subscription identifier information includes, at least one of, an international mobile subscriber identity (IMSI), an international mobile equipment identity (IMEI), and a universally unique identifier (UUID) with respect to the UE.

Example 14 may include the method of example 13 and/or some other example herein, further comprising: retrieving or causing to retrieve, based on reception of a second attach request message from the UE, at least one of, the IMSI and IMEI in the second attach request; sending or causing to send an authorization verification request message to the authorization server or entity to retrieve a device certificate; and receiving or causing to receive an authorization verification response message from the authorization server or entity.

Example 15 may include the method of example 14 and/or some other example herein, wherein the authorization verification request message includes the one or more subscription identifier information, the random number, and a uniform resource locator (URL) of a device certificate with respect to the UE, and the URL is in the second attach request message.

Example 15.5 may include the method of example 15 and/or some other example herein, wherein the device certificate is a global system for mobile communications association (GSMA) device certificate.

Example 16 may include the method of example 15 and/or some other example herein, wherein the URL of the GSMA device certificate is signed with a private key by the UE.

Example 17 may include the method of examples 11-16 and/or some other example herein, wherein the method is performed by an MME/AMF or portions thereof.

Example 18 may include a method, comprising: receiving or causing to receive an authorization verification request message; determining or causing to determine an authorization of RLOC for a UE based on an authorization verification; and transmitting or causing to transmit an authorization verification response message to an MME.

Example 19 may include the method of example 18 and/or some other example herein, wherein the authorization verification request message includes the one or more subscription identifier information, the random number, and a uniform resource locator (URL) of a device certificate with respect to the UE, and the URL is in the second attach request message.

Example 19.5 may include the method of example 15 and/or some other example herein, wherein the device certificate is a global system for mobile communications association (GSMA) device certificate.

Example 20 may include the method of example 19 and/or some other example herein, further comprising: verifying or causing to verify the URL of the GSMA device certificate based on a retrieval of an device certificate from a certificate entity.

Example 21 may include the method of examples 18-20 and/or some other example herein, wherein the method is performed by an authorization server or portions thereof.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, and/or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, technique, or process as described in or related to any of examples 1-21, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A non-transitory computer-readable medium (CRM) having instructions that, when executed by one or more processors, cause a user equipment (UE) to perform operations, the operations comprising:
    transmitting a first attach request message for accessing restricted local operator services (RLOS) provided by a serving network to a mobility management entity (MME);
    decoding, upon reception of an attach reject message from the MME, a random number in the attach reject message; and
    transmitting, to the MME, a second attach request message that includes the random number for accessing the RLOS and one or more subscription identifiers of the UE.

2. The non-transitory CRM of claim 1, wherein the MME is an MME of the serving network.

3. The non-transitory CRM of claim 1, wherein the UE is unauthenticated with respect to the serving network.

4. The non-transitory CRM of claim 1,
    wherein the first attach request message and the second attach request message respectively include information of the RLOS,
    wherein the first attach request message includes the one or more subscription identifiers of the UE, and
    wherein the one or more subscription identifiers include at least one of an international mobile subscriber identity (IMSI), an international mobile equipment identity (IMEI), or a universally unique identifier (UUID) with respect to the UE.

5. The non-transitory CRM of claim 4,
    wherein the second attach request message further includes a uniform resource locator (URL) of a device certificate with respect to the UE,
    wherein the URL of the device certificate is signed with a private key by the UE, and
    wherein the device certificate corresponds to a certificate authority with which an operator of the serving network has a business relationship or agreement.

6. The non-transitory CRM of claim 5, wherein the device certificate corresponds to a global system for mobile communications association (GSMA) device certificate.

7. The non-transitory CRM of claim 1, wherein the operations further comprise:

disconnecting from an original network,
wherein the UE is wirelessly connected to the original network that is different from the serving network.

8. The non-transitory CRM of claim 1, wherein the operations further comprise
generating the first attach request message; and
generating the second attach request message based on decoding the attach reject message.

9. The non-transitory CRM of claim 1, wherein the MME is an access and mobility management function (AMF) in a new radio (NR) network.

10. A non-transitory computer-readable medium (CRM) having instructions that, when executed by one or more processors, cause a mobility management entity (MME) to perform operations, the operations comprising:
receiving a first attach request message from a user equipment (UE) for accessing restricted local operator services (RLOS) provided by a serving network associated with the MME;
transmitting, based on reception of the first attach request message, an attach reject message that includes a random number generated by the MME;
decoding, based on reception of a second attach request message from the UE, the random number in the second attach request message; and
determining an authorization for the UE to access the RLOS, based on an authorization verification by an authorization server or entity.

11. The non-transitory CRM of claim 10, wherein the operations further comprise: generating the attach reject message that includes the random number.

12. The non-transitory CRM of claim 10,
wherein the attach reject message further includes a request for subscription identifier information from the UE, and
wherein the subscription identifier information includes at least one of an international mobile subscriber identity (IMSI), an international mobile equipment identity (IMEI), or a universally unique identifier (UUID) with respect to the UE.

13. The non-transitory CRM of claim 12, wherein the operations further comprise:
retrieving, based on reception of the second attach request message from the UE, at least one of, the IMSI or the IMEI in the second attach request message;
sending an authorization verification request message to the authorization server or entity to retrieve a device certificate; and
receiving an authorization verification response message from the authorization server or entity.

14. The non-transitory CRM of claim 13, wherein the authorization verification request message includes the subscription identifier information, the random number, and a uniform resource locator (URL) of the device certificate with respect to the UE, and the URL is in the second attach request message.

15. The non-transitory CRM of claim 14, wherein the URL of the device certificate is signed with a private key by the UE.

16. The non-transitory CRM of claim 15, wherein the MME is an access and mobility management function (AMF) in a new radio (NR) network.

17. A user equipment (UE), comprising:
one or more baseband processors, configured to:
transmit a first attach request message to a mobility management entity (MME) for accessing restricted local operator services (RLOS) provided by a serving network associated with the MME;
transmit, based on reception of an attach reject message, a second attach request message to the MME for accessing the RLOS; and
a central processing unit (CPU) coupled with the one or more baseband processors, configured to:
generate the first attach request message that includes RLOS information and one or more subscription identifiers of the UE; and
generate, based on decoding the attach reject message, the second attach request message that includes the RLOS information, the one or more subscription identifiers of the UE, and a random number decoded from the attach reject message.

18. The UE of claim 17, wherein the one or more baseband processors are further configured to:
receive the attach reject message from the MME,
wherein the attach reject message includes the random number and a request for UE authorization information.

19. The UE of claim 18, wherein the CPU is further configured to decode the received attach reject message.

20. The UE of claim 17,
wherein the second attach request message further includes a uniform resource locator (URL) of a device certificate with respect to the UE,
wherein the URL is signed by the UE with a private key of the UE, and
wherein the device certificate corresponds to a global system for mobile communications association (GSMA) device certificate.

* * * * *

UNITED STATES PATENT AND TRADEMARK OFFICE
CERTIFICATE OF CORRECTION

| | |
|---|---|
| PATENT NO. | : 11,528,607 B2 |
| APPLICATION NO. | : 17/268152 |
| DATED | : December 13, 2022 |
| INVENTOR(S) | : Farid Adrangi et al. |

It is certified that error appears in the above-identified patent and that said Letters Patent is hereby corrected as shown below:

In the Claims

Claim 19, Column 26, Line 39, "configured to decode the received attach reject message." should read --configured to decode the attach reject message--.

Signed and Sealed this
Twenty-fifth Day of July, 2023

Katherine Kelly Vidal
*Director of the United States Patent and Trademark Office*